Patented May 11, 1954

2,678,291

UNITED STATES PATENT OFFICE 2,678,291

METHOD OF AND MATERIALS FOR PRODUCING COATED ALUMINUM

Frank Palin Spruance, Jr., Ambler, and Nelson James Newhard, Jr., Oreland, Pa., assignors to American Chemical Paint Company, Ambler, Pa., a corporation of Delaware No Drawing. Application September 14, 1950, Serial No. 184,906

11 Claims. (Cl. 148—6.16)

This invention relates to the art of coating aluminum and alloys thereof in which aluminum is the principal ingredient. It is particularly directed to the provision of an improved solution and process for producing an amorphous coating on aluminiferous metals which coating is strongly protective against corrosion and is capable of serving as an excellent base for paint or other similar organic finish.

Before proceeding to a description of the nature of the present invention it is desired to refer to United States Patent 2,438,877 and 2,471,909 in which are disclosed certain solutions and processes for producing coatings on aluminum which coatings markedly improve corrosion resistance of the metal and afford an excellent base for paint and the like especially where the metal is to be subjected to the influence of excessively humid or salt laden atmospheres such as are encountered in the tropics or near the sea. As stated in the patents referred to operations according to their disclosures are somewhat critical in nature in that a high degree of acidity must be maintained as well as a very definite ratio of fluoride ion to dichromate ion. Therefore, it sometimes happens that in the hands of unskilled labor such processes may leave something to be desired.

With the foregoing in mind, one of the principal objects of the present invention is to so modify the processes of the patents referred to as to greatly simplify the coating procedure as well as to afford an optimum degree of economy in results. The foregoing, together with other benefits and advantages as will further appear, are obtained in the following manner.

The present invention is based upon the discovery that aluminiferous metals can be treated with certain aqueous acid solutions so as to produce thereon strongly adherent amorphous coatings which have outstanding merit in inhibiting corrosion and improving paint durability. The solutions which we have developed contain acids from the class of arsenic and phosphoric acids, chromic acid, a water soluble compound of fluorine and anions from the class consisting of chlorides and/or sulphates, all of which are employed in a certain well defined region as to the proportions of the ingredients and other conditions as will further appear.

Generally speaking, our novel coating process makes use of an aqueous acid solution containing arsenate or phosphate ions, fluoride ions, dichromate ions and chloride and/or sulphate ions. The form in which these ions are introduced seems to make little or no difference as long as they remain in the solution in the correct proportions and as long as the solution has the proper acidity. For instance, the phosphate or arsenate ion may be introduced as phosphoric acid or as a salt of phosphoric acid such as monosodium, monopotassium or mono-ammonium phosphate, arsenic-penta-oxide or as certain metallic arsenates such as zinc, iron or manganese. The fluoride ion may be introduced as a solution of hydrofluoric acid, as sodium fluoride or as potassium acid fluoride, sodium silico fluoride etc. The dichromate ion may be introduced as chromic acid ($CrO_3$) or as potassium or sodium chromate or dichromate. The chlorides and/or sulphates may be introduced as hydrochloric acid, sulphuric acid, sodium chloride, sodium sulphate, etc. Naturally, the amount of acid which is to be added will depend upon the form in which the essential ions are added to the solution as will be further explained below.

The kind and quantity of cations which may be present are not in themselves important except insofar as their salts act as buffers to regulate the effective acidity of the solution, or as they may cause the loss of active anions by precipitation of salts whose solubility products may be exceeded. Among the cations which may be present in reasonable quantity without doing harm are those aluminum, trivalent chromium, zinc, copper, manganese, iron, nickel, cobalt, calcium, barium, strontium, tin, and others. Excessive amounts of aluminum, calcium, etc., may tend to cause a loss of fluoride ion by precipitation, but do no other noticeable harm. Fluoride so lost may be replaced, and the solution thus restored to its optimum condition.

Foreign anions such as those which are customarily present in hard waters may also be present without causing any difficulty but reducing agents are harmful because they cause a loss of dichromate ion by reduction of hexavalent to trivalent chromium so that, in the interest of economy, the presence of these latter is not desirable.

The solutions used in performing my improved process are characterized by a content of acid, fluoride ion, phosphate or arsenate ion, dichromate ion, and chloride and/or sulphate ion which are within certain well defined regions of concentration as described below.

1. The phosphate ion content must be at least 2 grams per liter and, preferably, at least 6 grams per liter calculated as $PO_4$. However, it should be noted that at concentrations below 6 grams per liter the operative concentrations of dichromate ions and fluoride ion become extremely critical although between 2 grams per liter and 6 grams per liter of PO$_4$ the permissible range of fluoride to dichromate ion is sufficiently large to permit a reasonably practical operation of the process on a succession of pieces. However, within this range of phosphate concentration rather careful control and frequent restoration of phosphate, fluoride, acid and chromate are necessary to maintain the solution in optimum working condition. Below 2 grams per liter it is hardly possible to maintain the dichromate and fluoride concentrations with sufficient accuracy to operate the process even upon a small area of metal per unit volume of bath. We have found that a good working concentration of PO$_4$ content is between 20 and 100 grams per liter and that a practical maximum is about 285 grams per liter.

At this time we should like to point out that in the present process arsenate ions are equivalent to phosphate ions and may be substituted in whole or in part. The concentration of the arsenate ion calculated as PO$_4$ is stoichiometrically equivalent to phosphate ion.

2. The ratio of fluoride ion to dichromate ion by weight (calculated as chromic acid, CrO$_3$) must be between 0.015 and 0.135 and, preferably, above 0.06. A ratio of fluoride ion to dichromate ion which is somewhat too low leads to the development of very thin coatings and at still lower ratios no visible coating action takes place at all, the metal remaining smooth and bright.

It should be noted that in acidic baths of the type contemplated a double fluoride may serve as a source material for the necessary fluoride ion but in this event more fluorine must be present; in fact, not less than approximately two and two-thirds (2⅔) times as much fluorine must be supplied as is necessary when a simple fluoride is used as the source of fluoride ion. Furthermore, it is permissible to add even more double fluoride than corresponds to two and two-thirds (2⅔) times the desired fluoride ion content. The reason for this, apparently, is that the double fluoride seems to dissociate only partially. If two and two-thirds (2⅔) times the desired amount of fluoride ion is employed in the form of a double fluoride, the dissociation is sufficient to yield the concentration of fluoride ion desired; and if more than this amount is employed, it acts simply as a reservoir of available fluoride which will dissociate to yield fluoride in the proper quantity as the work progresses through the bath over long periods of time. Representative examples of double fluorides are fluosilicates, fluoborates, fluotitanates and fluohafniates.

3. The chloride and/or sulphate ion content must be at least 1 gram per liter calculated as NaCl. At concentrations below 1 gram per liter the ratio of fluoride ion to dichromate ion becomes increasingly critical and it is impossible to operate a bath in a satisfactory manner where the ratio of fluoride ion to dichromate ion by weight (calculated as chromic acid) is below 0.015. A good working concentration has been found to lie between 1 and 5 grams per liter of chloride and sulphate calculated as NaCl on a sodium basis. A practical maximum is about 50 grams per liter.

Although chloride ion and sulphate ion are substantially equivalent in our process we wish to note the fact that it has been found less desirable to use sulphate ion alone than to use chloride ion alone because the effect of the sulphate ion alone is not as pronounced in maintaining the wide ratio of fluoride to dichromate. However, when at least ten percent (10%) by weight of the chloride—sulphate ion concentration is chloride, a mixture of chloride and sulphate ions is just as satisfactory as using chloride ions alone.

4. The total acidity of the solution must not exceed a pH of 3.2 and the minimum pH appears to be in the neighborhood of 1.0 with the optimum pH range lying between 1.7 and 1.9. Acidity which is somewhat too high results in no coatings being formed even after prolonged treating periods.

We have disclosed the degree of acidity in terms of pH as this is a desirable criterion. Unfortunately, however, no completely accurate means for measuring the pH of these solutions has been found. Indicators in general are somewhat unreliable because they are oxidized by the dichromate ion present. Nevertheless, the use of "pH papers" will give qualitative results which are useful. The most reliable method we have found for measuring the pH of these solutions is to employ the electrical pH meter with a glass electrode. This is true despite the fact that there is a fluoride attack upon the glass. Hydrogen and quinhydrone electrodes are inapplicable because of the oxidizing effect of the dichromate.

When using the glass electrode to measure the pH it should be noted that the reading will often exhibit a curious excursion from time to time to a value as much as a pH unit higher and then back to a value even lower than at first. Therefore, in making a reading it is necessary to wait until the final, nearly steady reading of pH is obtained by the meter. If this procedure is adopted the teachings herein given with respect to the range of permissible pH can be relied on to yield very good results.

In carrying out my improved process, the surfaces to be coated should be clean. The cleaning which forms no part of the present invention may be carried out by conventional methods. For example, grease and dirt may be removed by a mild silicate alkali spray or by the use of an emulsion of a grease solvent. Heavy oxide films may be removed by acid or caustic soda treatments.

The cleaned work, which may be either wet or dry, is then treated with a solution of proper composition according to the present invention, one example of which is the following:

*Formula No. 1*

|  | Grams |
|---|---|
| Phosphoric acid, 75% | 64 |
| Sodium fluoride | 1.34 |
| Chromic acid (CrO$_3$) | 10 |
| NaCl | 1 |
| Water, to make one liter. | |

The fluoride: dichromate ratio (as CrO$_3$) of the foregoing solution will be 0.0606.

Treatment of the surfaces to be coated according to our process may be performed either by immersing the surfaces in the solution, by flowing or spraying the solution upon the work or by any other convenient technique in which the solution is allowed to act upon the metal. If the solution is applied to the work only momentarily after which the adhering film is allowed to act for some time it may be found desirable to use a solution which is considerably more concentrated than that given in Formula No. 1.

The action of the solution may be accelerated by heat although the process may be carried out successfully at temperatures ranging from ordinary living or room temperatures to as much as 180° F. or even more. The resulting coatings appear to be entirely similar, quite independent of the temperature, although the time for complete coating formation may be reduced from about 5 to 10 minutes to about 1 to 2 minutes or even less by employing temperatures which are in the upper end of the range given.

By way of additional examples, we wish to give below a number of alternative bath formulas which will serve to illustrate a few of the many variations in composition which are useful within the operative ranges and proportions given above.

*Formula No. 2*

|  | Grams |
|---|---|
| $H_3AsO_4$ (75%) | 16.9 |
| NaF | 1.133 |
| $CrO_3$ | 10.0 |
| NaCl | 3.12 |
| Water to make 1 liter. | |

*Formula No. 3*

|  | Grams |
|---|---|
| $NaH_2PO_4.H_2O$ | 33.8 |
| NaF | 1.71 |
| $CrO_3$ | 8.0 |
| NaCl | 2.0 |
| $Na_2SO_4$ | 4.0 |
| Water to make 1 liter. | |

*Formula No. 4*

|  | Grams |
|---|---|
| $H_3PO_4$ | 22.6 |
| $K_2SiF_6$ | 3.86 |
| $K_2Cr_2O_7$ | 15.0 |
| NaCl | 2.0 |
| $Na_2SO_4$ | 8.0 |
| Water to make 1 liter. | |

*Formula No. 5*

|  | Grams |
|---|---|
| $H_3AsO_4$ (75%) | 47.3 |
| NaF.HF | 1.258 |
| $K_2Cr_2O_7$ | 14.7 |
| NaCl | 2.0 |
| Water to make 1 liter. | |

*Formula No. 6*

|  | Grams |
|---|---|
| $H_3PO_4$ | 22.6 |
| $KBF_4$ | 1.7 |
| $K_2Cr_2O_7$ | 12.0 |
| NaCl | 6.0 |
| Water to make 1 liter. | |

In connection with Formula No. 4, it should be noted that, if the silico-fluoride were to be calculated as F and considered as being completely dissociated, the $F:CrO_3$ ratio would then be too high to fall within the ratio given above. However, as previously pointed out, only a portion of the silico-fluoride apparently dissociates to yield available fluoride ions and, due to this phenomenon, when replenishing a bath such as that of Formula No. 4, the fluoride ion content need not be replaced as often as the other coating producing ingredients because apparently undissociated $SiF_6$ acts as a reservoir of available fluoride which is drawn upon as the bath is used upon a succession of pieces.

Maintenance of our solutions in proper operating condition during the processing of a succession of surfaces requires merely that the proportion of dissolved ions and the acidity be kept within the prescribed limits by suitable additions of chemicals and, since none of the coating producing constituents in the bath need to exist in the solution in a "supersaturated" state, replenishment constitutes no particular problem.

After the treatment with my improved solution, as described, the surfaces can either be rinsed with water and then dried or first dried, followed by a water rinse and a second drying. In the second instance, the adhering treating solution dries upon the coated surface, and, where it is not desired to paint the surface, it may be left in an unrinsed condition after it has been dried. However, if paint or other organic finish is to be applied to the coated and dried surface, it should be thoroughly rinsed with pure water to remove all soluble salts, because such salts are likely to cause blistering of the paint or other organic film, especially if the surface is to be subjected or exposed to humid conditions. If pure water is not available, a dilute acidulated rinse of chromic acid may be used.

Although, as previously indicated, our coating solutions can be prepared from a variety of starting substances, possibly the simplest, cheapest and most easily available combination of chemicals from which to prepare them is an alkali fluoride, phosphoric acid and/or arsenic acid, chromic acid and salt. Exact maximum and minimum amounts of fluoride and dichromate to be used in our improved solutions are difficult to specify aside from the $F:CrO_3$ ratio. Nevertheless, generally speaking, it has been found that:

1. The fluoride ion content should lie between 0.15 and 12.5 grams per liter, and preferably between 0.6 and 6 grams per liter.

2. The dichromate ion content should correspond to a total $CrO_3$ content of between 7.4 and 66.6 grams per liter, and preferably between 16 and 20 grams per liter.

3. The chloride ion or a mixture of chloride ion and sulphate ion wherein at least ten percent (10%) by weight of the total chloride-sulphate ion concentration is derivable from chloride, should lie between 1 and 50 grams per liter and preferably between 1 and 5 grams per liter.

A good balance between economy and dragged-out chemical, ease of control and excellent character of the coating secured is obtained in the preferred ranges specified above.

Since the essential ingredients of our coating solution are fluoride ion, phosphate and/or arsenate ion, dichromate ion, hydrogen ion and chloride and/or sulphate ion, it has been found desirable, in making up and replenishing the solution, to use concentrated admixtures which need only to be added to water or to acidified water to produce operative solutions of the proper composition. Such admixtures have quite obvious advantages as will be appreciated by those skilled in this art.

In making a fresh solution, the concentrated admixture may contain, for example, compounds of fluorine, of phosphorus or arsenic (as orthophosphate or arsenate) hexavalent chromium, chlorides and/or sulphates, all in a form soluble in water at a pH of from 1.0 to 3.2. The composition should contain the constituents in the following proportions:

|  | Parts by weight |
|---|---|
| Fluorine | 1 |
| Chromium, calculated as $CrO_3$ | 7.4 to 66.6 |
| Phosphate or arsenate, calculated as $PO_4$ | 2 to 70 |
| Chloride or chloride and sulphate, calculated as NaCl | 1 to 50 |

The best compositions should contain, for each part fluorine, 13.3 to 20 parts chromium, calculated as $CrO_3$, 7 to 50 parts phosphate or arsenate, calculated as $PO_4$, and 1 to 5 parts chloride or chloride plus sulphate calculated as NaCl.

The above admixtures may or may not be compounded to include free acid. The inclusion of acid is desirable from the standpoint of ease in preparing the actual coating solutions, since nothing but water and the concentrated admixture is necessary. However, strong acid solutions containing fluoride and chromate are corrosive and somewhat dangerous to handle. Therefore, acid may be omitted from the composition.

Preferred embodiments of our invention, insofar as an admixture for making up our improved coating solution from easily obtainable chemicals is concerned, are as follows:

*Formula No. 7*

| | Pounds |
|---|---|
| $K_2SiF_6$ | 10 |
| $CrO_3$ | 12 |
| $NaH_2PO_4.H_2O$ | 78 |
| | 100 |

When the total material of Formula No. 7 is added to from 150 to 300 gallons of water, from 1 to 2 gallons of 20° Bé. hydrochloric acid should be added in order to adjust the acidity to an optimum, and also to serve as a source of chloride ion. In conjunction with Formula No. 7, it will be noted that potassium silico fluoride, a double fluoride, is used as the source of available fluoride. While only approximately 3 lbs. of the potassium silico fluoride is immediately soluble, the insoluble matter will settle to the bottom of the solution, and, as work progresses through the bath using up fluoride in the formation of the coating, the initially insoluble portion of the potassium silico fluoride will go into solution, apparently disassociating to such an extent as to maintain the necessary and optimum concentration of fluoride ion for relatively long periods of time. Therefore, when materials of such nature are used, when it becomes necessary to replenish the bath, it is not necessary to replenish the fluoride except after long periods of use.

Another formula for a concentrate suitable for dilution with about 9 times its volume of water to make a coating solution of optimum quality is the following:

*Formula No. 8*

| | Grams |
|---|---|
| $KHF_2$ | 2.52 |
| $CrO_3$ | 37.9 |
| $H_3PO_4$ (75%) | 800 |
| NaCl | 76.8 |

Water, to make 1 liter.

This material should be stored and shipped in containers suitably corrosion resistant.

No purpose would be served in multiplying the number of such formulas given. However, we should like to note that for reasons of cheapness and availability we have preferred to use an alkali fluoride or acid fluoride, an alkali chromate, an alkali dichromate or free chromic acid, and alkali arsenate of free arsenic acid, or an alkali phosphate of phosphoric acid, and sodium chloride for making compositions of this type.

We claim:

1. In a process for coating aluminum, the step which consists in treating the surface with an acid aqueous solution the essential active coating producing ingredients of which are fluoride ions, dichromate ions, ions from the class of arsenate and phosphate ions, and ions from the class of chloride and sulphate ions, the ions being present in amounts stoichiometrically equivalent to

| | Grams per liter |
|---|---|
| Fluorine | 0.15 to 12.5 |
| Chromic acid ($CrO_3$) | 7.4 to 66.6 |
| Ions of acids from the class consisting of phosphoric and arsenic acids (calculated as $PO_4$) | 2 to 285 |
| Ions from the class consisting of chlorides and sulphates (calculated as NaCl) | 1 to 50 | the ratio of fluoride ion to dichromate, expressed as $F:CrO_3$, being from 0.015 to 0.135; the pH of the solution being from about 1.0 to 3.2, as measured by a glass-electrode pH meter after a nearly steady reading is obtained.

2. The process of claim 1, wherein the ions are present in the solution in amounts stoichiometrically equivalent to

| | Grams per liter |
|---|---|
| Fluorine | 0.6 to 6 |
| Chromic acid ($CrO_3$) | 16 to 20 |
| Ions of acids from the class consisting of phosphoric and arsenic acids (calculated as $PO_4$) | 20 to 100 |
| Ions from the class consisting of chlorides and sulphates (calculated as NaCl) | 1 to 5 | and wherein the $F:CrO_3$ ratio is from 0.06 to 0.135 and the pH of the solution is from 1.7 to 1.9.

3. A process according to claim 1, wherein fluoride ions in the solution are supplied by use of a double fluoride in an amount which contains a quantity of fluorine at least approximately two and two-thirds (2⅔) times that which would be required in the form of a simple fluoride to yield the concentration of fluoride specified in said claim.

4. A process according to claim 1, wherein the chloride-sulphate ion concentration in the solution is provide by a mixture of chloride and sulphate with at least ten per cent (10%) by weight of said ion concentration being supplied by chloride.

5. An acid aqueous solution for coating aluminum, the essential active coating-producing ingredients of which solution are fluoride ions, dichromate ions, ions from the class of arsenate and phosphate ions, and ions from the class of chloride and sulphate ions, the ions being present in amounts stoichiometrically equivalent to

| | Grams per liter |
|---|---|
| Fluorine | 0.15 to 12.5 |
| Chromic acid ($CrO_3$) | 7.4 to 66.6 |
| Ions of acids from the class consisting of phosphoric and arsenic acids (calculated as $PO_4$) | 2 to 285 |
| Ions from the class consisting of chlorides and sulphates (calculated as NaCl) | 1 to 50 | the ratio of fluoride ion to dichromate, expressed as $F:CrO_3$, being from 0.015 to 0.135; the pH of the solution being from about 1.0 to 3.2, as measured by a glass-electrode pH meter after a nearly steady reading is obtained.

6. A solution according to claim 5, but in which the ions are present as follows:

| | Grams per liter |
|---|---|
| Fluorine | 0.6 to 6 |
| Chromic acid ($CrO_3$) | 16 to 20 |
| Ions of acids from the class consisting of phosphoric and arsenic acids (calculated as $PO_4$) | 20 to 100 |
| Ions from the class consisting of chlorides and sulphates (calculated as (NaCl) | 1 to 5 | and in which the F:$CrO_3$ ratio is from 0.06 to 0.135 and the pH is from 1.7 to 1.9.

7. A solution according to claim 5, wherein fluoride ions are supplied by use of a double fluoride in an amount containing a quantity of fluorine at least approximately two and two-thirds (2⅔) times that which would be required in the form of a simple fluoride to yield the quantity of fluoride specified in the said claim.

8. A solution according to claim 5, wherein the chloride-sulphate ion concentration is provided by a mixture of chloride and sulphate with at least ten percent (10%) by weight of said ion concentration being supplied by chloride.

9. An admixture for use in preparing a solution for coating aluminum, the essential, active, coating-producing ingredients of which admixture consist of the following in the proportions indicated and in forms which are soluble in water at pH from 1.0 to 3.2:

| | Parts by weight |
|---|---|
| Fluoride | 1 |
| Dichromate (calculated as $CrO_3$) | 7.4 to 66.6 |
| Ions of acids from the class consisting of phosphoric and arsenic acids (calculated as $PO_4$) | 2 to 70 |
| Ions from the class consisting of chlorides and sulphates (calculated as NaCl) | 1 to 50 |

10. An admixture according to claim 9, wherein the ingredients are proportioned as follows:

| | Parts by weight |
|---|---|
| Fluoride | 1 |
| Dichromate (calculated as $CrO_3$) | 13.3 to 20 |
| Ions of acids from the class consisting of phosphoric and arsenic acids (calculated as $PO_4$) | 7 to 50 |
| Chloride-sulphate (calculated as NaCl) | 1 to 5 |

11. An admixture according to claim 9, wherein a double fluoride is employed to supply the fluoride content, the quantity of said double fluoride being sufficient to supply a quantity of fluorine which is at least two and two-thirds (2⅔) times that which would be required in the form of a simple fluoride.

References Cited in the file of this patent

UNITED STATES PATENTS

| Number | Name | Date |
|---|---|---|
| 2,438,877 | Spruance Jr. | Mar. 30, 1948 |
| 2,471,909 | Spruance Jr. | May 31, 1949 |
| 2,472,864 | Spruance Jr. et al. | June 14, 1949 |
| 2,487,137 | Hoover et al. | Nov. 8, 1949 |
| 2,494,910 | Spruance Jr. et al. | Jan. 17, 1950 |
| 2,507,956 | Bruno et al. | May 16, 1950 |